US009110922B2

(12) United States Patent
Bengio et al.

(10) Patent No.: US 9,110,922 B2
(45) Date of Patent: Aug. 18, 2015

(54) JOINT EMBEDDING FOR ITEM ASSOCIATION

(75) Inventors: Samy Bengio, Mountain View, CA (US); Jason Weston, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/019,221

(22) Filed: Feb. 1, 2011

(65) Prior Publication Data

US 2011/0191374 A1 Aug. 4, 2011

Related U.S. Application Data

(60) Provisional application No. 61/300,356, filed on Feb. 1, 2010.

(51) Int. Cl.
*G06F 7/00* (2006.01)
*G06F 17/30* (2006.01)

(52) U.S. Cl.
CPC .... *G06F 17/30244* (2013.01); *G06F 17/30879* (2013.01)

(58) Field of Classification Search
CPC .................................... G06F 17/30876
USPC .................................. 707/705, 736
See application file for complete search history.

(56) References Cited

U.S. PATENT DOCUMENTS 6,304,864 B1 * 10/2001 Liddy et al. ............ 706/15
6,480,841 B1    11/2002 Higashio et al.
6,625,581 B1 *  9/2003 Perkowski ............. 705/27.1
6,961,712 B1 * 11/2005 Perkowski ............. 705/26.62
7,054,465 B2 *  5/2006 Rhoads .................. 382/100
2003/0142847 A1 * 7/2003 Rhoads .................. 382/100

(Continued)

FOREIGN PATENT DOCUMENTS

CN    1920820    2/2007
EP    2124159    9/2014

(Continued)

OTHER PUBLICATIONS

International Search Report mailed Apr. 6, 2001 in PCT/US2011/023398.

(Continued)

*Primary Examiner* — Hosain Alam
*Assistant Examiner* — Eliyah S Harper
(74) *Attorney, Agent, or Firm* — Fish & Richardson P.C.

(57) ABSTRACT

Methods and systems to associate semantically-related items of a plurality of item types using a joint embedding space are disclosed. The disclosed methods and systems are scalable to large, web-scale training data sets. According to an embodiment, a method for associating semantically-related items of a plurality of item types includes embedding training items of a plurality of item types in a joint embedding space configured in a memory coupled to at least one processor, learning one or more mappings into the joint embedding space for each of the item types to create a trained joint embedding space and one or more learned mappings, and associating one or more embedded training items with a first item based upon a distance in the trained joint embedding space from the first item to each said associated embedded training items. Exemplary item types that may be embedded in the joint embedding space include images, annotations, audio and video.

25 Claims, 9 Drawing Sheets

(56) References Cited

U.S. PATENT DOCUMENTS

| | | | |
|---|---|---|---|
| 2005/0177805 A1* | 8/2005 | Lynch et al. | 715/968 |
| 2006/0031246 A1* | 2/2006 | Grayson | 707/102 |
| 2007/0047002 A1* | 3/2007 | Hull et al. | 358/3.28 |
| 2007/0130112 A1* | 6/2007 | Lin | 707/2 |
| 2009/0177685 A1* | 7/2009 | Ellis et al. | 707/103 R |
| 2009/0313294 A1 | 12/2009 | Mei et al. | |
| 2010/0299332 A1* | 11/2010 | Dassas et al. | 707/741 |
| 2011/0010319 A1 | 1/2011 | Harada et al. | |
| 2011/0184981 A1* | 7/2011 | Lu et al. | 707/774 |

FOREIGN PATENT DOCUMENTS

| | | |
|---|---|---|
| JP | 11-96176 | 4/1999 |
| JP | 2007-317168 | 12/2007 |
| JP | 2009-28290 | 12/2009 |
| WO | 2009/035108 | 3/2009 |

OTHER PUBLICATIONS

Xu et al., "Automatic Web Image Annotation Via Web-Scale Image Semantic Space Learning," Advances in Data and Web Management, Apr. 2, 2009, pp. 211-222.

Carneiro et al., "Supervised Learning of Semantic Classes for Image Annotation and Retrieval," IEEE Transactions on Pattern Analysis and Machine Intelligence, Mar. 1, 2007, pp. 394-410, vol. 29, No. 3.

Office Action in Australian Application No. 2011210535, mailed Jul. 17, 2014, 3 pages.

Office Action in Japanese Application No. 2012-551391, mailed Aug. 19, 2014, 9 pages (with English translation).

* cited by examiner

JOINT EMBEDDING FOR ITEM ASSOCIATION

CROSS REFERENCE TO RELATED APPLICATIONS

This application claims the benefit of U.S. provisional application No. 61/300,356, filed on Feb. 1, 2010, which is hereby incorporated by reference in its entirety.

BACKGROUND

1. Technical Field

Embodiments of the present invention relate to associating items of various types stored in a memory.

2. Background Art

Items of various types such as images, audio recordings, video recordings, and text, are digitally stored and are accessible through computer networks and services such as the Internet and the World Wide Web ("web"). In some cases, these items can be associated with each other based upon their origination sources or based upon specific features detected in them. For example, an image can be related to specific text in an article in which that image appears, articles that have same or similar text can be related to each other, and an image in which a particular object is detected can be related to a text representation of the name of that object. The ability to associate items of various types that relate to a particular subject of interest is important to fully utilize the vast stores of information that are accessible through the likes of the Internet and the web.

Numerous conventional methods are available with which items of various types can be associated with each other. Conventional methods may associate items based on semantic content. However, conventional methods do not adequately scale to take advantage of the very large amounts of data that are available through the web. Furthermore, conventional methods may not adequately determine all useful semantic relationships among various items in very large collections of items.

Image annotation is an application based upon semantically associating items of various types. Known conventional methods for image annotation based on semantic relationships may not scale to very large data sets, and may not adequately determine semantic relationships to benefit from such very large data sets. Many conventional methods are based upon extracting various image features and then training independent simple classifiers, such as linear support vector machines (SVMs), for each category of images. Training independent classifiers for each category of images can be inefficient for large data sets. The performance of independent classifiers can also degrade rapidly with the number of annotations.

An alternative non-parametric conventional approach is to use K-nearest neighbor methods to select, from a training set, images that are nearest in the image feature space to a new image and to annotate the new image based upon the annotations of the nearest images. However, finding a nearest-neighbor with a high degree of accuracy may be highly inefficient when the training data set is very large.

Other conventional approaches include concatenating image features and associated text labels for each training image, and then probabilistically relating new images to the training images. Some conventional approaches cluster pre-annotated training images based on image features, and then determine an annotation for a new image based on a similarity between features of the new image and one or more of the clusters of training images. For example, the annotation for the new image may be an annotation from the closest cluster of training images. Creating new image annotations based primarily on manually annotated images may not scale to very large data sets. Also, probabilistic approaches can be highly inefficient for large data sets, for example, because of having to re-calibrate the probabilities of numerous other relationships when a probability of one relationship is changed.

SUMMARY

Methods and systems to associate semantically-related items of a plurality of item types using a joint embedding space are disclosed. The disclosed methods and systems are scalable to large, web-scale training data sets. According to an embodiment, a method for associating semantically-related items of a plurality of item types includes embedding training items of a plurality of item types in a joint embedding space configured in a memory coupled to at least one processor, learning one or more mappings into the joint embedding space for each of the item types to create a trained joint embedding space and one or more learned mappings, and associating one or more embedded training items with a first item based upon a distance in the trained joint embedding space from the first item to each said associated embedded training items. Exemplary item types that may be embedded in the joint embedding space include images, annotations, audio and video. In an embodiment, the method can further include embedding the first item at a first location determined by applying the learned mapping for a first item type of the plurality of item types, and annotating the first item based upon the one or more associated embedded training items.

According to another embodiment, a system for associating semantically-related items of a plurality of item types includes, a processor, a memory coupled to the processor, a joint embedding space configurator, a mapper, and an item associator. The joint embedding space configurator is configured to embed training items of the plurality of item types in a joint embedding space in the memory. The mapper is configured to learn one or more mappings into the joint embedding space for each of the item types to create a trained joint embedding space and one or more learned mappings. The item associator is configured associate one or more embedded training items with a first item based upon a distance in the trained joint embedding space from the first item to each said associated embedded training items.

Yet another embodiment is a computer readable medium storing instructions wherein the instructions when executed cause at least one processor to associate semantically-related items of a plurality of item types using a method. The method includes, embedding training items of a plurality of item types in a joint embedding space configured in a memory coupled to at least one processor, learning one or more mappings into the joint embedding space for each of the item types to create a trained joint embedding space and one or more learned mappings, and associating one or more embedded training items with a first item based upon a distance in the trained joint embedding space from the first item to each said associated embedded training items.

An embodiment of a method for responding to a query includes receiving the query, determining a location in a joint embedding space configured in a memory coupled to at least one processor wherein a distance between a first item and a second item embedded in the joint embedding space corresponds to a semantic relationship between the first and second items, identifying one or more results based upon one or more items embedded in the joint embedding space closest to the location, and returning the one or more results as a response to the query. Items of a plurality of item types are embedded in the joint embedding space.

A method of querying includes transmitting a query to a server, and receiving a response from the server, wherein the response is formed by the server by identifying a location corresponding to the query in the joint embedding space, and by identifying one or more result items closest to the identified location. The server includes a joint embedding space configured in a memory coupled to at least one processor, where a distance between a first item and a second item embedded in the joint embedding space corresponds to a semantic relationship between the first item and the second item, and where items of a plurality of item types are embedded in the joint embedding space.

Further features and advantages of the present invention, as well as the structure and operation of various embodiments thereof, are described in detail below with reference to the accompanying drawings.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION

Figure 1:
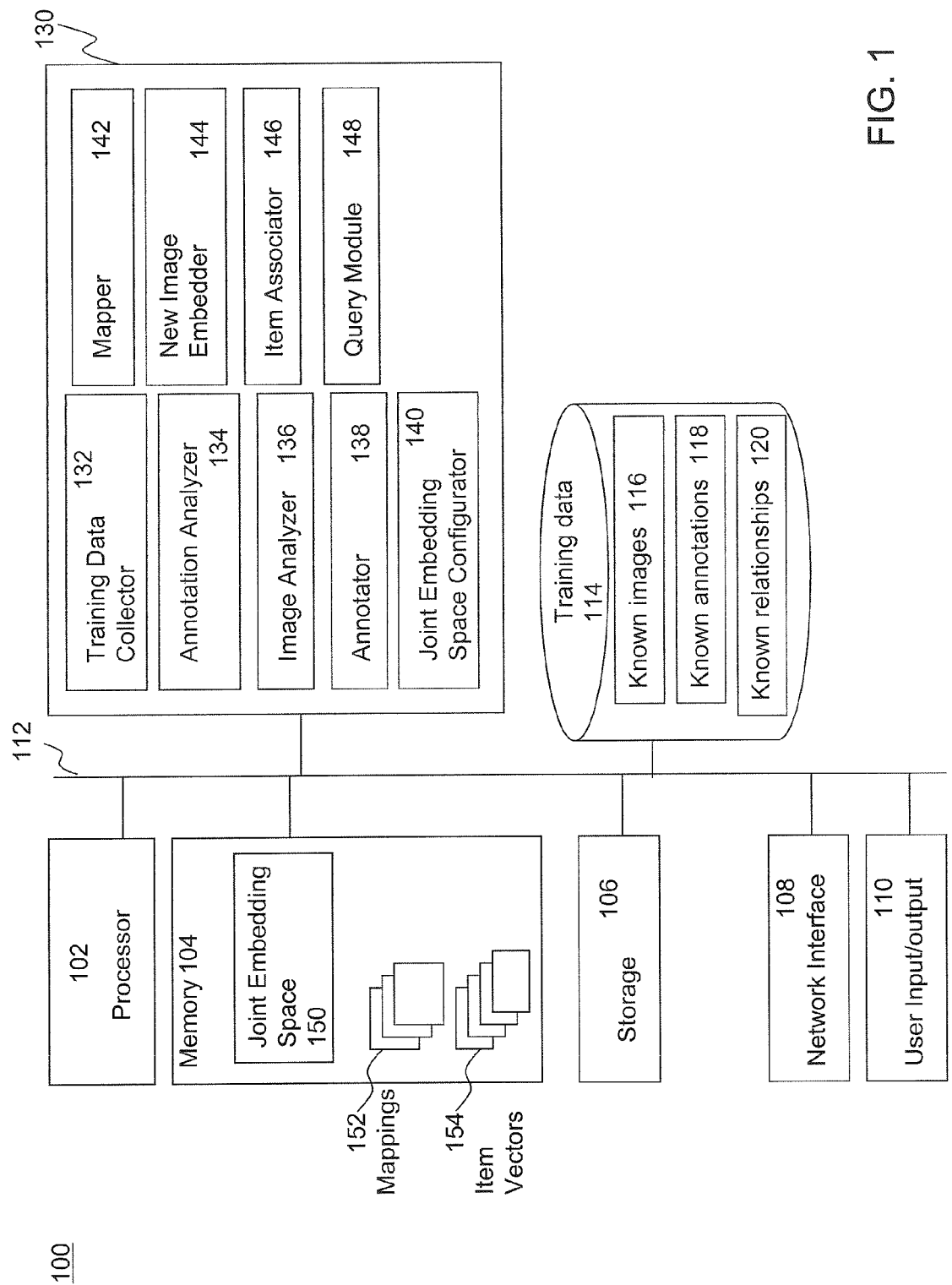
FIG. 1 illustrates a system for associating semantically-related items of a plurality of item types, according to an embodiment.

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Overview

It is desirable that very large collections of items of various types are utilized to find relationships among items based on semantic content. For example, for a new image, an annotation based on relationships in a large collection of items may be more descriptive than an annotation based on a small collection of items. Therefore, methods and systems for semantically associating items that are scalable to very large collections of information and that consider a variety of relationships among items are desired.

Embodiments of the present invention include methods and systems to utilize a range of relationships among items of various data types, available in training data sets, in order to determine associations (also referred to as "relationships") between items of the training data sets and one or more other training items or newly embedded items. Embodiments of the present invention are scalable to large corpora of training data items such as those that can be collected through the web. For example, images, audio, video, and text, stored in resources accessible via the web enables the creation of very large training data sets having potentially unlimited numbers of training data records. Scalable and efficient methods for determining associations among various items are useful for many purposes such as image annotation, image retrieval, content-based data retrieval, and the like. For conciseness and convenience, embodiments of the present invention are described below primarily using the application of image annotation. However, it should be understood that other applications utilizing relationships between items are contemplated within the scope of embodiments of the present invention. For example, discovered associations between image items and annotation items can be utilized for other applications such as audio and video annotation, image retrieval, retrieval of audio and video based on semantic content, and the like.

Embodiments of the present invention scale to very large training databases. Additionally, embodiments of the present invention do not require manually annotated images as training data, and can utilize annotations with substantial noise. The use of very large training corpora by embodiments of the present invention is aided by the ability to utilize noisy annotations. For example, embodiments of the present invention can generate training data based on the click data from user queries executed using Google's Image Search service. The scalability of embodiments of the present invention also enables efficient continual improvement of the system by incorporating new training information as they become available. In this document, an "annotation" is a textual annotation and may include one or more keywords, queries, sentences, or other text content.

Furthermore, by embedding all items types in a joint embedding space, embodiments of the present invention create associations that are based on the relative semantic content of the respective items. A "joint embedding space," as used herein, is a multi-dimensional embedding space in which multiple types of items such as, but not limited to, images, annotations, audio and/or video, can be embedded, so that their locations reflect their semantic content based upon nearby embedded items.

Also, separately embedding items of different types in the joint embedding space enables more flexible combinations between items. For example, in an embodiment of the present invention, a new image can be associated with annotations regardless of any characteristics of the training image upon which the annotations are based.

System for Semantically Associating Items

FIG. 1 illustrates a system 100 to associate items of a plurality of item types, according to an embodiment of the present invention. System 100 is configured to associate image items with annotation items to automatically annotate images. Other embodiments of the present invention can be configured to establish associations between items of item types such as, but not limited to, video, audio, image, and annotations System 100 comprises at least one processor 102, a memory 104, a storage 106, a network interface 108, a user input/output device 110, communication infrastructure 112, training database 114, and joint embedding space module 130. System 100 can be implemented on a server computer, on one or more computers interconnected with a communication network, a server farm, a cloud computing platform, or the like. Processor 102 comprises one or more processors that are configured to execute applications such as joint embedding space module 130. Memory 104 can comprise a single memory or multiple interconnected memories located in one or more computers. In an embodiment, memory 104 comprises dynamic random access memory (DRAM). Storage 106 comprises one or more interconnected non-volatile computer readable medium, and may include hard disks, flash memory, optical storage device, and the like. Network interface 108 includes an interface to any type of network, such as, but not limited to, Ethernet and wireless local area network (LAN), to which system 100 may be connected. User input/output device 110 comprises interfaces to one or more of keyboard, mouse, and display device through which a user, such as a human operator or an application, can control the operations of system 100 and/or display output from system 100. Communication infrastructure 112 may include one or more communication buses such as, but not limited to, a system bus, Peripheral Component Interconnect (PCI) bus, Universal Serial Bus (USB), Firewire, or Ethernet. Communication infrastructure 112 provides the interconnection means to communicatively couple components of system 100.

Training database 114 comprises a collection of training items of various item types. As used in this document, the term "database" implies any collection of data and methods to access the collection of data, and does not necessarily imply a commercially available database management system (DBMS). According to an embodiment, training database 114 includes one or more of a known image database 116, a known annotations database 118, and a known relationships database 120. The training databases 114 may be of any size. Embodiments of the present invention may be particularly advantageous, relative to conventional methods, where the training databases are very large, i.e., web-scale with millions of training items or more. Training database 114 can comprise a single database directly connected to system 100 or a distributed database communicatively coupled to system 100. In an embodiment, training database resides in storage 114. In another embodiment, training database resides in one or more remote computers that are communicatively coupled through, for example, network interface 108 to system 100. In yet another embodiment, training database 114 can reside internally to system 100 as well as in remote computers.

According to an embodiment, training database 114 comprises queries submitted to the web-based Image Search service from Google, Inc., and information on images returned in response to those queries. For example, each query may be stored in known annotations database 118, and a sequence or set of images returned in response to the query can be stored in known images database 116. With respect to each query, the number of times each image was clicked on by a user ("query click data") may also be stored. In an embodiment, for each image stored in known images database 116, the one or more queries based upon which the largest number of users selected or clicked on that image may be stored in known annotations database 118. Known relationships database 120 includes relationships between items in the training database. In an embodiment, known relationships database 120 includes relationships between training images in known images database 116 and training annotations in known annotations database 118, relationships between two or more training images, and relationships between two or more training annotations. Training data may be generated using numerous additional methods. Other means of acquiring training data for image annotation, include, but are not limited to, manual annotation of images and collecting images that are pre-annotated by users.

Memory 104 includes a multi-dimensional joint embedding space 150. According to an embodiment, each dimension of joint embedding space 150 is defined by a real-valued axis. The joint embedding space is intended to automatically locate semantically-related items in close proximity to each other. Within the joint embedding space, semantically similar items are automatically located in close proximity to each other without regard to the type of each item. In an embodiment, the location of an item x in the joint embedding space may be specified as $<x_1, x_2, \ldots, x_D>$ where $x_i$ $i=1 \ldots D$ is a real number specifying the location of item x in dimension i in the joint embedding space of D dimensions. Increasing the dimensionality of the joint embedding space 150 often improves the accuracy of the associations between embedded items. A high-dimensional joint embedding space can represent a large training database, such as a training database acquired from web-accessible sources, with higher accuracy than a low-dimensional joint embedding space. However, higher dimensionality also increases the computation complexity. Therefore, the number of dimensions can be determined based upon factors such as, the size of the available training database, required accuracy level, and computational time. Defining joint embedding space 150 based upon real-valued axis increases the accuracy level of associations, because a substantially continuous mapping space can be maintained. Memory 104 can also include a plurality of item vectors 154 corresponding to respective items embedded in the joint embedding space 150, and a plurality of mappings 152 that map each of the item types to the joint embedding space 150.

Joint embedding space module 130 includes functionality to create a joint embedding space 150, to learn mappings for one or more item types into the joint embedding space 150, and to determine associations from a newly embedded item to training items already embedded in the joint embedding space 150. The logic instructions of joint embedding space module 130 can be implemented in software, firmware, hardware, or using a combination thereof. According to an embodiment, joint embedding space module 130 includes logic instructions for automatically annotating images using the joint embedding space 150 and learning mappings or images and annotations into the joint embedding space 150 using training data in known images database 116, known annotations database 118, and known relationships database 120. In an embodiment, joint embedding space module 130 comprises a training data collector 132, an annotation analyzer 134, an image analyzer 136, an annotator 138, a joint embedding space configurator 140, a mapper 142, a new image embedder 144, an item associator 146, and a semantic query module 148.

Training data collector 132 includes functionality to acquire training data that, for example, may be stored in training database 114. For example, in an embodiment, training data collector 132 can collect and process image query data including the queries, the response set of images returned in response to each query, and in each response set, the images clicked on by a user. The acquired data may then be processed to store the images, and for each image, one or more queries to which the image is related as indicated by the number of users who clicked on the image in response to a corresponding query. The images can be stored in known images database 116, and the queries can be stored in known annotations database 118. In an embodiment, known relationships between stored images and stored annotations can be stored in known relationships database 120. In some embodiments, query click data can also be used to determine relationships between images, for example, by considering images clicked on with respect to the same query as related. Also, in some embodiments, relationships may be determined among one or more stored annotations, for example, by considering words or terms that appear frequently together as related. In various embodiments, training data collector 132 can also acquire manually annotated images and/or other pre-annotated images. Other means of acquiring training data, such as by directly acquiring annotated images by web crawling or incorporating pre-prepared collections of annotated data are possible and are contemplated within the scope of embodiments of the present invention.

Annotation analyzer 134 includes the functionality to analyze and process annotations. In an embodiment, annotation analyzer 134 includes the functionality to process annotations that are used as training annotations. For example, annotation analyzer 134 may process queries, such as queries stored in known annotations database 118, to rectify typos, to correct spelling errors, to uniformly order a sequence of keywords, translate from one language to another, and like purposes. In various embodiments, each annotation can be represented as a string of characters, a vector of keywords, or like manner.

Image analyzer 136 includes the functionality to analyze images, for example, by extracting image features. Image features can include, but are not limited to, one or more of edges, corners, ridges, interest points, and color histograms. Feature extraction may be based on one or more known methods such as, but not limited to, Scale Invariant Feature Transform (SIFT) and Principal Component Analysis (PCA).

In an embodiment, images are represented by very sparse vectors of features. Each image is first segmented into several overlapping square blocks at various scales. Each block is then represented by the concatenation of color and edge features. A dictionary of previously trained typical such blocks, is then used to represent each image as a bag of visual words, or a histogram of the number of times each dictionary visual word is present in the image, yielding vectors having over 200 non-zero values on average. An example representation of images is described in Grangier, D., & Bengio, S., "A discriminative kernel-based model to rank images from text queries," Transactions on Pattern Analysis and Machine Intelligence, vol. 30, Issue 8, 2008, pp. 1371-1384.

Annotator 138 includes the functionality to construct an annotation for a new image. In an embodiment, for example, annotator 138 constructs the annotation for a newly embedded image based upon one or more annotations which are closest to the newly embedded image in joint embedding space 150.

Joint embedding space configurator 140 includes functionality to create and to embed training items in joint embedding space 150. In an embodiment, for example, joint embedding space configurator 140 embeds images and annotations from training database 114 in the joint embedding space. Training images from known images database 116, and training annotations from known annotations database 118 can be embedded in the joint embedding space 150.

Mapper 142 includes the functionality to learn one or more mappings 152 for each item type into the joint embedding space 150. Mappings 152 specify how each item vector 154 is located in the joint embedding space 150. In an embodiment, mapper 142 is configured to learn mappings from an image space and an annotation space to joint embedding space 150. For example, through a process of learning based upon the training images and annotations embedded in the joint embedding space 150, mapper 142 determines a mapping function from the image space to the joint embedding space 150 and also mappings of annotations to the joint embedding space 150. In an embodiment, a set of image features to be determined for each image is defined, and each image is represented as a vector of those image features. The mapping function for images can specify a mapping from the vector of image features to the joint embedding space. In various embodiments of the present invention, the mapping functions can be linear or non-linear.

New image embedder 144 includes the functionality to embed an image in joint embedding space 150 based upon a learned mapping. For example, new image embedder 144 can determine the location in which a new image is to be embedded based upon a mapping function learned using mapper 142. In an embodiment, new image embedder 144 determines a set of features of a new image and uses a mapping from the set of features to a location in joint embedding space 150.

Item associator 146 includes the functionality to determine associations, in the joint embedding space 150, between a newly embedded item and already embedded items. In an embodiment, item associator 146 determines the relationships between a newly embedded image and one or more annotations in the joint embedding space 150. For example, item associator 146 can determine a ranked list of annotations that are closest to the newly embedded image. Annotator 138 may annotate the newly embedded image based upon the ranked list of annotations determined by item associator 146.

Semantic query module 148 includes the functionality to analyze associations in the joint embedding space 150 in order to output one or more items of any item types that are associated with another specified item. For example, semantic query module 148 may output all images that are associated with a particular query term by identifying the query term in the joint embedding space 150 and then identifying all images associated with that query term.

Method for Semantically Associating Items

Figure 2:
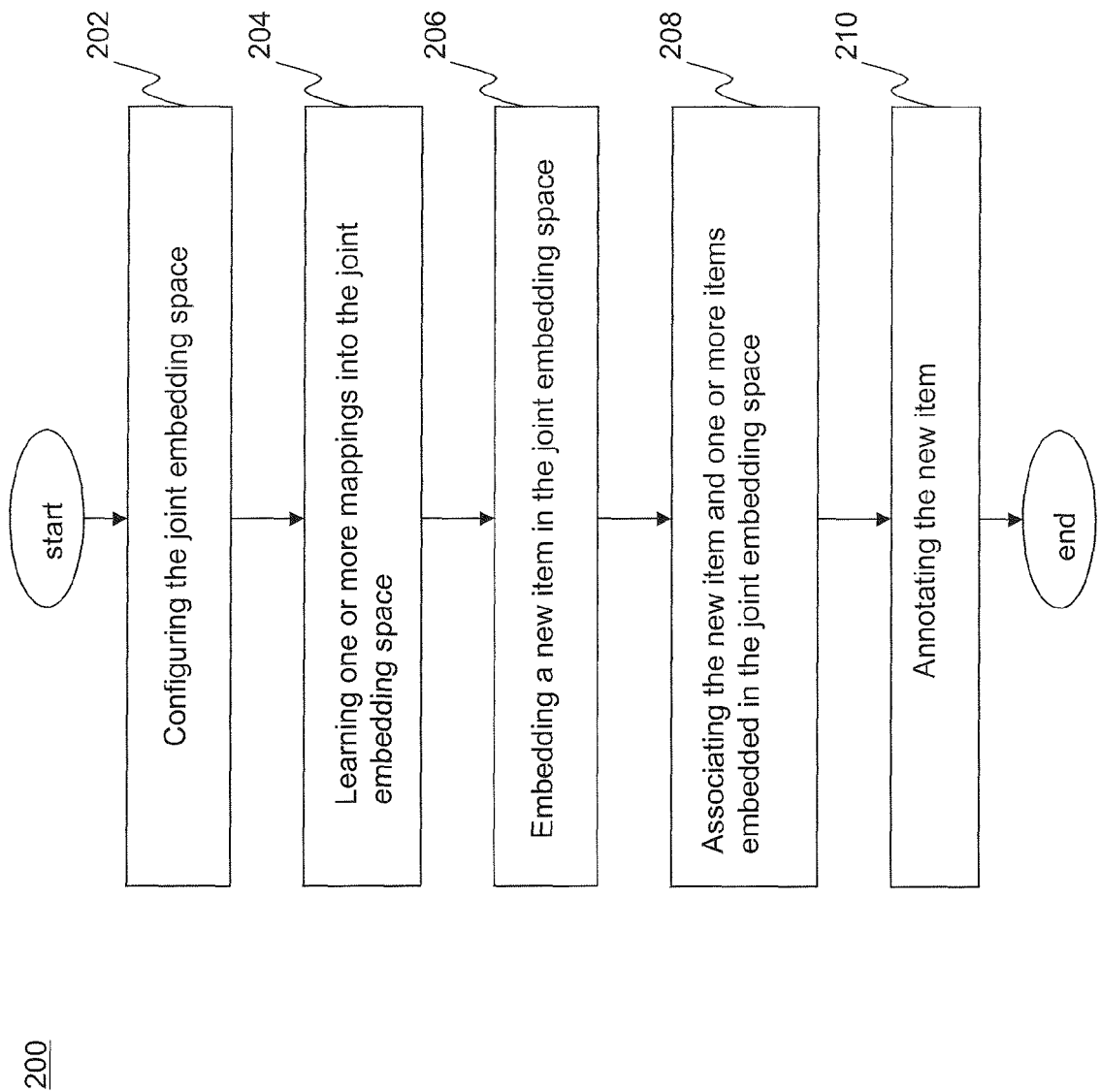
FIG. 2 illustrates a method for associating semantically-related items of a plurality of item types, according to an embodiment.

FIG. 2 illustrates a method 200 (steps 202-210) for associating semantically-related items of a plurality of item types with each other, according to an embodiment of the present invention. According to an embodiment, the associations can be used to annotate a new item.

In step 202, a joint embedding space is configured. In an embodiment, step 202 may be implemented by joint embedding space configurator 140 to create joint embedding space 150 in memory 104. The number of dimensions of the joint embedding space may be predetermined. As mentioned above, the number of dimensions can be determined based upon one or more factors, such as, but not limited to, required accuracy, available computing resources, and the size of the training database. Each dimension of the joint embedding space may be defined by a real-valued axis.

According to an embodiment, the joint embedding space is configured to embed data items including images and corresponding annotations. For example, in an embodiment, a corpus of pre-annotated images can be used to obtain training images and corresponding training annotations. In another embodiment, as described above, query click data from a web-based image search service can be used as training images and training annotations. Configuring the joint embedding space is described in further detail below with respect to FIG. 3.

In step 204, mapping functions to map each type of item to the joint embedding space are learned. According to an embodiment, the learning process iteratively selects sets of embedded training items and determines if the distances between the respective selected items based on their current locations in the joint embedding space correspond to the known relationships between them. For example, consider an embedded training image, its corresponding embedded training annotation, and an unrelated embedded training annotation. Then, if their current locations in the joint embedding space are such that the distance from the image to the corresponding annotation is less than the distance from the image to the unrelated annotation and at least a predetermined margin, the items can be considered to be already located consistently with the selected relationships, and therefore no changes to the mappings or their current locations are required. Otherwise, the mappings and locations of the items are adjusted so that their locations relative to each other are improved.

Adjusting the location of any item in the joint embedding space can, in addition, trigger the adjustment of mapping functions and/or adjustment of locations of other items due to changes in the current mapping functions. For example, changing the location of an embedded annotation can change the current mapping function from the image space to the joint embedding space to maintain the consistency of the locations of images relative to the annotation.

The learning process, which is iterative, may be ended based on predetermined termination criteria, such as when a predetermined number of iterations of learning occur without substantial change to the mappings as determined by, for example, the relative magnitude of adjustments of locations of items. At the end of the learning process, the locations of items in the joint embedding space reflect the semantic relationship between items. In some embodiments, the learning process (step 204) can be performed from time to time as needed to incrementally improve the joint embedding space and learned mappings, for example, by embedding new training data or by adjusting the termination criteria to allow the learning process to continue to refine the joint embedding space and learned mappings.

Also, at the end of the learning process, the mapping functions can be considered stable. Depending upon the type of item, the mapping functions can differ in form. In an embodiment, the mapping function for images is used to map any image based on its features, to the joint embedding space, whereas each annotation is uniquely mapped. In the following, the term "trained joint embedding space" is used to refer to the joint embedding space after the learning process has been performed, when it is unclear from the context. The learning process 204 is further described below with respect to FIGS. 4-5.

In step 206, a new item is embedded in the joint embedding space. Prior to the embedding of the new item, according to an embodiment, the embedding of training data is completed and the learning process for mappings is completed. The new item is embedded in the trained joint embedding space in a location determined based upon a learned mapping function for the corresponding item type. In an embodiment, a new image can be embedded in the trained joint embedding space in a location determined based upon the learned mapping function for images. A predetermined set of features of the new image is calculated and the learned image mapping function is applied to the calculated set of features to determine the embedding location in the joint embedding space. Image feature vectors and annotation representations are described above with respect to FIG. 1.

In step 208, one or more associations between the newly embedded item and the previously embedded items are determined. In an embodiment, associations between a newly embedded image and previously embedded annotations are determined. The associations are based on a distance, such as the Euclidean distance, from the location of the newly embedded item to the locations of respective previously embedded items. Various methods of using the annotations that have associations to the new image can be used. In one embodiment, all annotations that are within a predefined threshold distance from the new image can be considered. In another embodiment, the annotation with the shortest distance from the new image is considered.

In step 210, the newly embedded item is annotated based on the associations determined in step 208. In an embodiment, a newly embedded image is annotated based on the annotation that is closest to that image. In another embodiment, the newly embedded image can be annotated based on all annotations within a predetermined distance from the image. In yet another embodiment, the one or more annotations within a predetermined distance from the newly embedded image may be combined and further processed in order to create an annotation to be assigned to the newly embedded image.

Configuring the Joint Embedding Space

Figure 3:
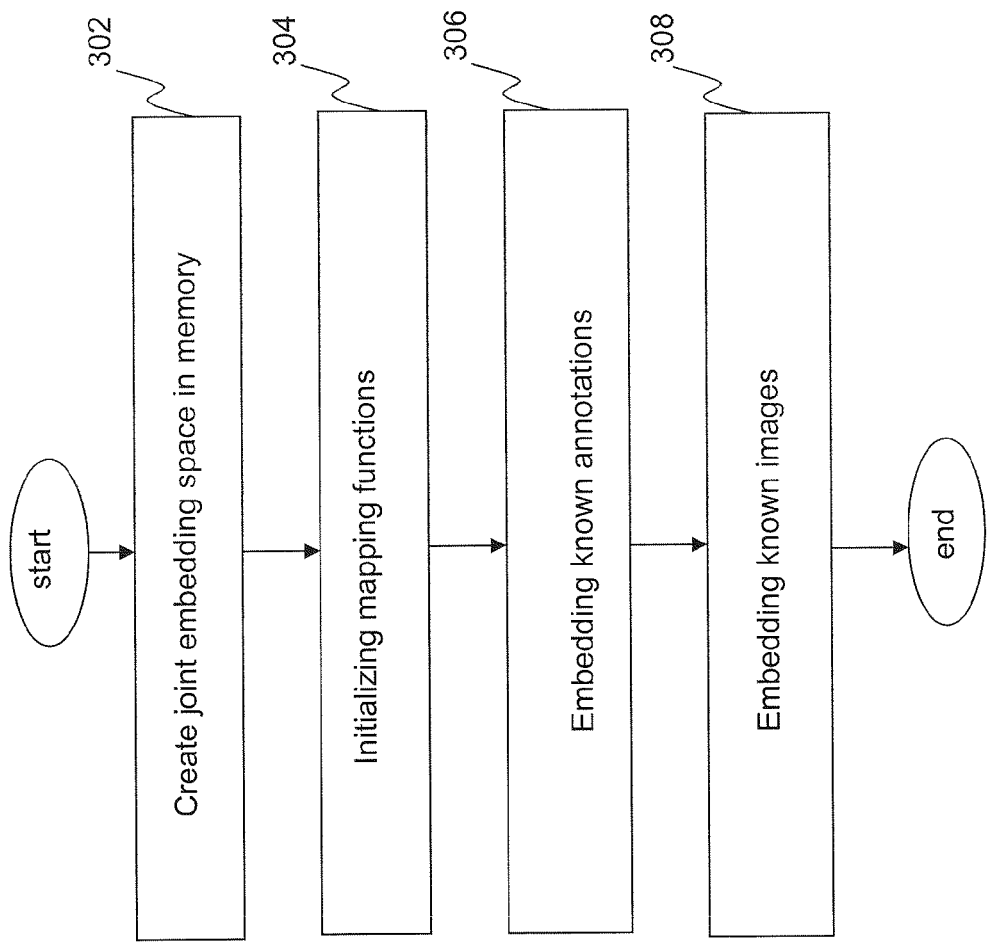
FIG. 3 illustrates a method for configuring a joint embedding space, according to an embodiment.

FIG. 3 illustrates a method (steps 302-308) for configuring a joint embedding space, according to an embodiment of the present invention. For example, in an embodiment, steps 302-308 perform the processing of step 202.

In step 302, the joint embedding space is created in a memory. In an embodiment, an X×D size array or matrix can be defined, where X is the number of training items to be embedded and D is the number of dimensions of the joint embedding space. Other structures are possible for the representation of the joint embedding space in memory, and are contemplated within the scope of the embodiments. A person of skill in the art would understand that the joint embedding space can be distributed between volatile memory and other memory resources such as virtual memory. As described above, the dimensionality of the joint embedding space is to be determined based upon various factors. Also, as described above according to an embodiment, locations in the joint embedding space can be determined based on real-valued axis defined for each dimension.

In step 304, mapping functions are initialized for each item type that is embedded in the joint embedding space. According to an embodiment where the joint embedding space is configured for images and annotations, one mapping function from an image space to the joint embedding space is initialized, and a separate mapping function is initialized for each embedded annotation. The mapping function for images is based on a predetermined set of features, and therefore can be applied to any new image. In an embodiment, the mapping for images is specified as a linear mapping and can be represented as a matrix. The mapping for each annotation is unique to that annotation and cannot be generalized to other annotations. In an embodiment, the mapping for each annotation linearly maps that annotation to a location in the joint embedding space.

Steps 306 and 308 include the embedding of training annotations and training images, respectively, according to an embodiment. The training data comprising training annotations and training images may, for example, be from training database 114. Training data is described above with respect to FIG. 1. In an embodiment, the training data comprises query click data from the Google Image Search service. Training images comprise images returned in response to an image search query, where the link or thumbnail to the image was clicked upon. Training annotations comprise queries entered into Image Search.

In steps 306 and 308, the training annotations and training images can be embedded in the joint embedding space. Embedding an item in the joint embedding space, according to an embodiment, can be performed by assigning a location to that item. According to an embodiment, the initial mappings are random and therefore the initial location for each item is random. According to an embodiment, a linear mapping for all images and a linear mapping for the $i^{th}$ annotations are specified, respectively as shown in (1) and (2) below.

$$\Phi_I(x) = Vx \quad (1)$$

$$\Phi_W(i) = W_i \quad (2)$$

where x is a image feature vector, V is a matrix in which the initial values can be random, and $W_i$ indexes the $i^{th}$ column of a Y×D matrix. Y is the number of annotations and D is the number of dimensions in the joint embedding space.

The subsequent training process, which is described below, is intended to refine the locations of each image and annotation such that the final location in which an item is embedded in the trained joint embedding space is reflective of the item's semantic content in relation to other items located nearby.

Training and Learning Mappings to the Joint Embedding Space

Figure 4:
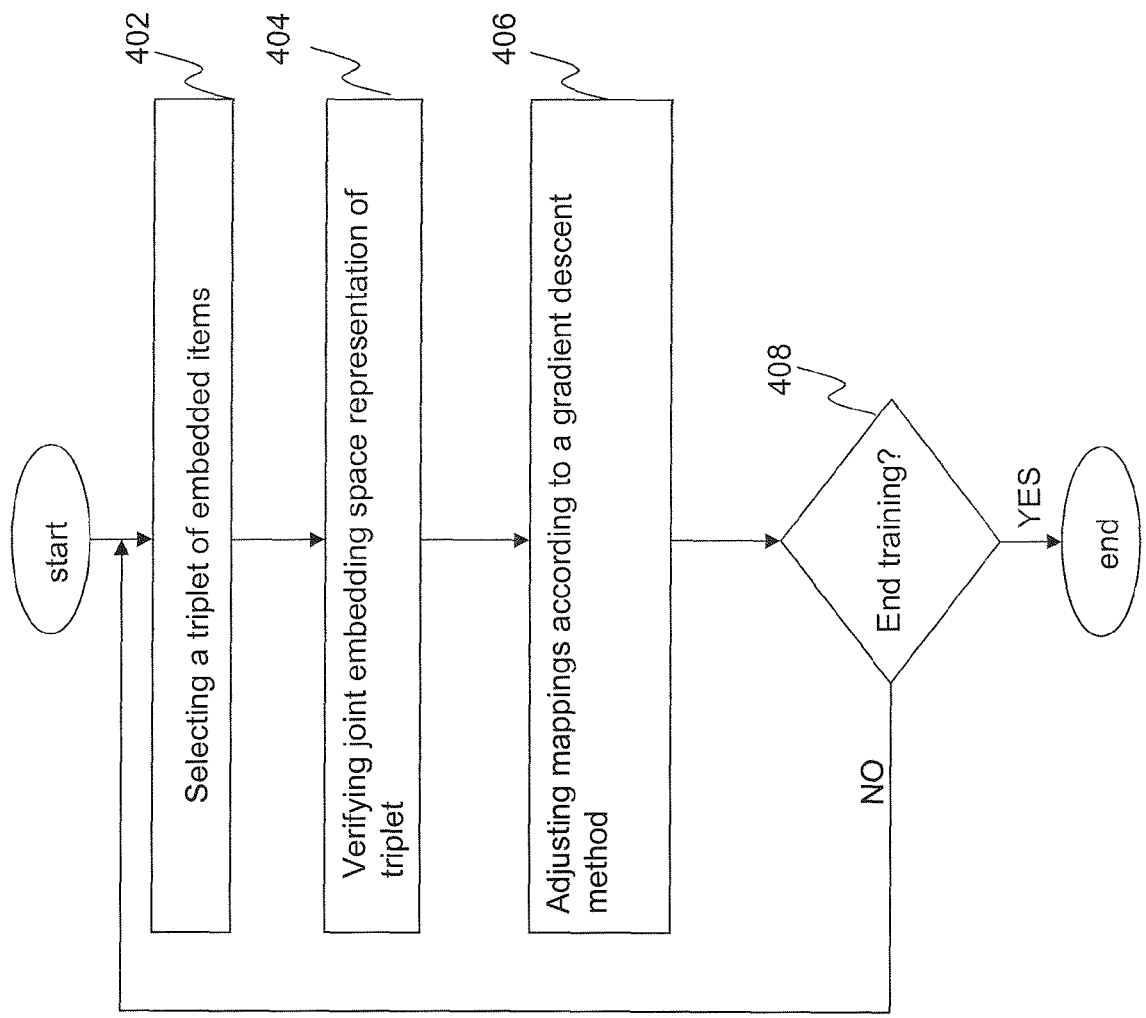
FIG. 4 illustrates a method for learning one or more mappings to the joint embedding space, according to an embodiment.

FIG. 4 illustrates a method (steps 402-408) of learning, according to an embodiment of the present invention. In an embodiment, the processing of step 204 can be performed by steps 402-408. Steps 402-408 illustrate a stochastic process that can scalably train the joint embedding space and learn mappings for each item type based on a relatively small sampling of a very large training set. Steps 402-408 are iteratively performed until the satisfaction of a predetermined termination criterion.

In step 402, a triplet of items is selected such that the strength of the relationship between a first pair of items of the triplet is greater than the strength of relationship between a second pair. In an embodiment, a triplet of items having one embedded image and two embedded annotations, or two embedded images and one embedded annotation, is selected where at least one pair of items is known to be more strongly related than another pair of items. For example, the triplet can be an image, an annotation related to the image, and an annotation unrelated to the image. In the triplet, the related pair includes the image and the related annotation, and the unrelated pair includes the image and the unrelated annotation. The triplet can be selected, for example, based upon information available in known relationships database 120. In other embodiments, different combinations of items may be selected.

In step 404, the distance between the known related pair and the distance between the unrelated pair in the joint embedding space are determined, and the distances are compared to the relative strength of the relationships between the first and second pairs of the triplet. If the distances between the items in each pair of the triplet in the joint embedding space are consistent with the known relationships, then no change to the mappings and joint embedding space are required, and processing can progress directly to step 406. If, however, the distances between the items in each pair of the triplet in the joint embedding space are not consistent with the known relationships, then processing progresses to step 406. For example, it may be determined whether the distance between the related pair is greater than the distance between the unrelated pair by a predetermined safety margin. In an embodiment, the distance is the Euclidean distance.

In step 406, the mappings and/or locations of one or more of the selected items in the joint embedding space are adjusted in order to make the relative distances among the selected items adhere to the relative strengths of the known relationships among the selected triplet of items. For example, if the triplet, described above, consisting of an image, related annotation, and unrelated annotation were selected, then the locations of any or all items in that triplet can be changed to adhere to those known relationships. The locations may be changed to have the distance between the related pair be less than the distance between the unrelated pair plus a safety margin, which can be predetermined. In an embodiment, the changes in the locations of selected items are determined based on a gradient descent technique. Gradient descent techniques, and particularly stochastic gradient techniques, are used to efficiently train the joint embedding space based on a relatively small sampling of a very large training data set. In an embodiment, as described below, a cost function is optimized to scale to very large data sets using stochastic gradient descent. Usunier, N., Buffoni, D., & Gallinari, P., "Ranking with ordered weighted pairwise classification," Proceedings of the 26th International Conference on Machine Learning, 2009, describes an example cost function.

Figure 5:
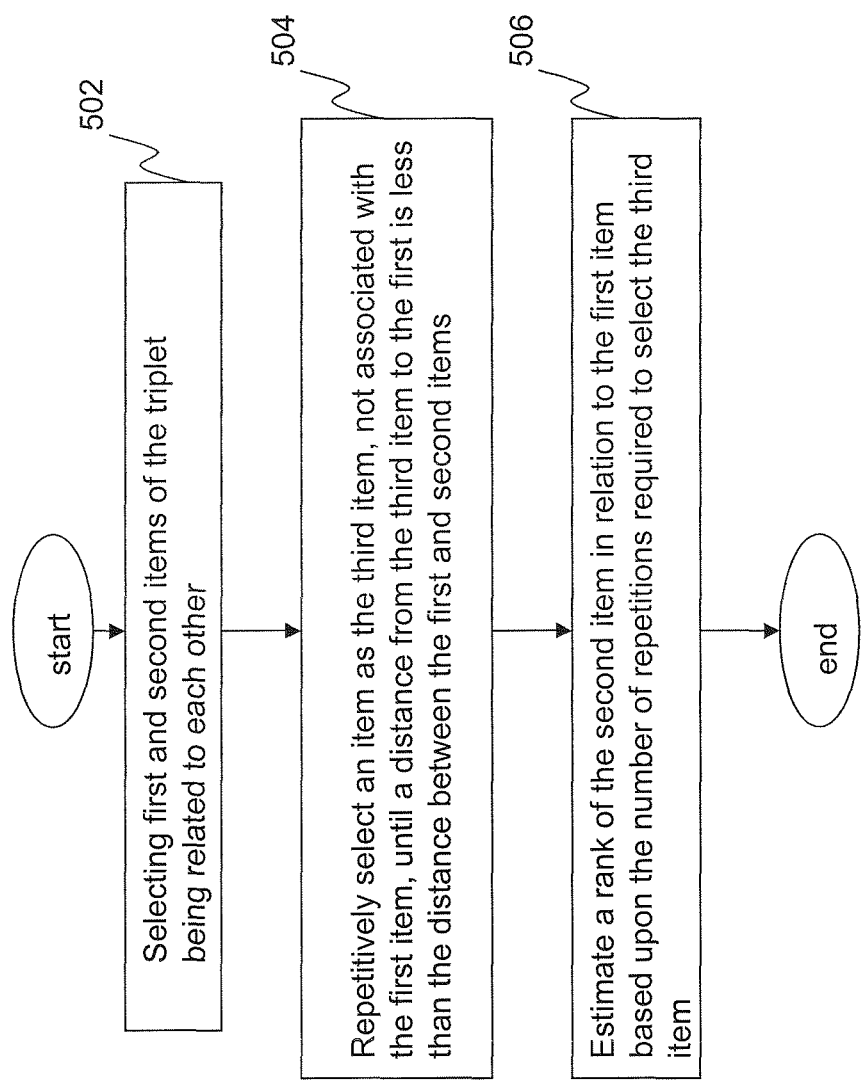
FIG. 5 illustrates a method for selecting a triplet of embedded items in the joint embedding space, according to an embodiment.

The adjustments made to locations of items of the selected triplet in applying gradient descent may be based on the current location of the item, and one or more factors such as, but not limited to, the rank of items relative to one another, desired level of accuracy, and desired speed of convergence. In an exemplary embodiment, a new location for an item of the triplet is determined by adjusting its current location by a distance amount based upon the rank of the related pairing. With respect to a first item in a selected triplet, for example, an image, the "rank" of the related annotation, refers to the position of the related annotation in the sequence of all annotations arranged in order of least to greatest distance from the image. The goal of the training process is to adjust items in the joint embedding space such that the most related annotation closest to the image, i.e. has the highest rank with respect to the image. In an embodiment, the rank of an item x can be defined as in (3):

$$rank_y(f(x)) = \sum_{i \neq y} I(f_i(x) \geq f_y(x)) \quad (3)$$

where $rank_y(f(x))$ is the rank of the related item y (e.g., related annotation in the example triplet) given by the distance function $f_i(x)$. $f_i(x)$ is a similarity function, returning high values for high similarity. $f_i(x)$ measures a relationship between items i and x. Thus, in an embodiment, $f(x)$ is the inverse of the Euclidean distance to item x in the joint embedding space. Adding a margin, the rank (3) can be specified as in (4).

$$rank_y^1(f(x)) = \sum_{i \neq y} I(1 + f_i(x) > f_y(x)) \quad (4)$$

where $rank_y^1(f(x))$ can be considered the margin-penalized rank of y. Thus, $rank_y^1(f(x))$ compares the value of $f_i(x)$ for each annotation i with the corresponding value for the related annotation y. FIG. 5 illustrates a method of estimating the rank without determining the order of all annotations with respect to an item.

Embodiments may adjust the step size applied to the gradient descent technique by weighting the adjustment based upon the rank of the related pair in the triplet. According to an embodiment, a loss of a rank position at the higher end of the rankings incurs a higher cost than at the lower end. For example, the cost function that the gradient descent technique operates to minimize is increased when the related annotation is ranked near the highest rank (but not highest ranked) than when the related annotation is ranked in the lower rankings. Adjusting the step size of the gradient descent technique based on rank of items is a technique by which the learning process can be optimized for speed and to achieve high accuracy level with respect to the most likely annotations for images.

The contribution to the overall cost function by each selected triplet $(x, y, \bar{y})$, where $(x, y)$ is the related pair and $(x, \bar{y})$ is the unrelated pair, can be defined as in (5).

$$\overline{err}(f(x), y, \bar{y}) = L(rank_y^1(f(x))) |1 - f_y(x) + f_{\bar{y}}(x)| \quad (5)$$

$L(rank_y^1(f(x)))$ is the weight based on rank, as noted above. In each iteration of training, according to an embodiment, the locations and mappings of the selected triplet are adjusted (if the corresponding distances are inconsistent with the known relationships) so that subsequent to the adjustments the value of (5) is lower than in the current iteration. In an embodiment, the adjustment to mappings and locations is determined by (6).

$$\beta(t+1) = \beta(t) - \gamma_t \frac{\partial \overline{err}(f(x), y, \bar{y})}{\partial \beta(t)} \quad (6)$$

$\beta(t)$ is the parameter, such as a mapping, to be adjusted at time t, and $\gamma_t$ is the learning rate at time t. The partial derivative term in (6) represents the gradient which, in this embodiment, is the approximate error of the selected triplet with respect to the parameter) $\beta(t)$ being adjusted.

In step 406, in an embodiment, the locations of items can be adjusted based on the gradient step determined by (6). In an embodiment, the locations of the annotations can be adjusted, for example, by adjusting the mapping for the annotations in the selected triplet. The locations of images may be adjusted by adjusting the image mapping function. In an embodiment, the mappings are adjusted so that the annotations are moved with respect to the related images. The image mapping function can be adjusted accordingly, for example, based on (6) to be consistent with the newly moved related annotations.

In step 408, one or more termination criteria are evaluated. If the termination criteria are satisfied, the learning process is ended. If the termination criteria are not satisfied, the process iterates steps 402-408. The termination criteria can be based on the magnitude of the changes in location of selected items over one or more iterations of steps 402-408. In another embodiment, the termination criteria can be based on evaluating whether a set of randomly selected embedded items are substantially compliant with the known relationships. Various other termination criteria are possible, and are contemplated within embodiments of the present invention. It should be noted that while the accuracy of relationships in the joint embedding space would likely improve with increased iterations of executing the learning process, the improvements gained beyond a point may not be significant. Thus, the termination criteria can be determined based on factors such as the size and nature of the training data set, the level of accuracy desired, and available computing power.

Ranking Relationships for Very Large Training Data Sets

FIG. 5 illustrates a method (steps 502-506) of selecting a triplet of items, according to an embodiment. In an embodiment, the processing of step 402 can be performed by steps 502-506.

In step 502, a first and a second item of the triplet of items are selected so that they are related with each other. For example, the first item can be an embedded training image and the second item can be an embedded training annotation which is a query related with the first item.

In step 504, a third item is selected such that the relationship between the third item and the first item is either nonexistent or weaker than the relationship between the first and second items, but the distance from the first item to the third item in the joint embedding space is less than the distance from the first item to the second item. Deliberately selecting a third item that violates the distance condition among the triplet of items often leads to faster convergence of the learning process than, for example, when selecting the third item randomly from items that are not related to the first item. Thus, a third item can be repetitively picked from items that are not related to the first item until both conditions mentioned above in this paragraph are met by the selected third item.

In step 506, the rank of the second item in relation to the first item is determined. In an embodiment, the rank of the second item relative to the first item is estimated based upon the number of iterations that were required to select the third item which satisfies the two conditions set forth with respect to step 504. The rank determined according to step 506 can be indicated as in (7).

$$rank_y^1(f(x)) = \left\lfloor \frac{Y-1}{N} \right\rfloor \quad (7)$$

N is the number of iterations that was required to select the third item, and Y is the total number of embedded annotations. By estimating the rank in a fast and efficient manner, such as in (7), embodiments of the present invention can substantially increase the speed of the learning process increasing the scalability to very large training data sets. For example, estimating the rank using (7) can scale up to very large data sets compared to other techniques, such as using (4), of using stochastic gradient descent for the cost (5).

Other Embodiments

The joint embedding space, as noted above, can be used to embed items of various data types. In addition to the image annotation application described above, other applications can be implemented using the joint embedding space configured with very large training data.

In an embodiment, audio and/or video recordings can be annotated using the joint embedding space. In another embodiment, one or more item types of audio, video, images and text can be related to each other. For example, all items, regardless of type, that are semantically related to the annotation "dolphin" can be retrieved based on the distance of those items to the annotation "dolphin" in the joint embedding space.

Figure 6:
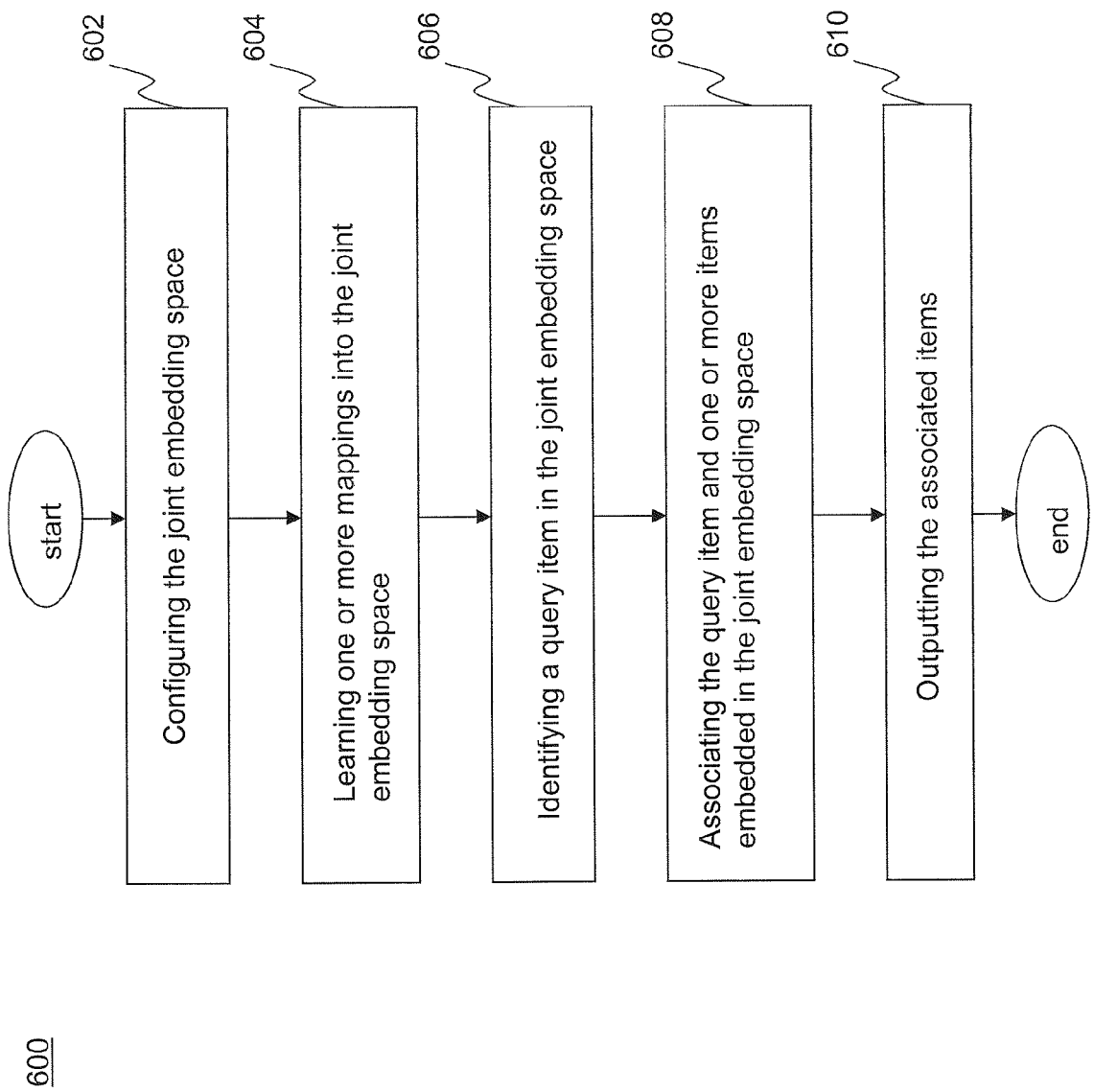
FIG. 6 illustrates a method for associating semantically-related items of a plurality of item types, according to an embodiment.

FIG. 6 illustrates another method 600 for associating semantically-related items of a plurality of item types, according to an embodiment. Method 600 can be used for item retrieval based on semantic associations among stored items. In an embodiment, method 600 can be implemented in semantic query module 148. For example, method 600 can be used to retrieve all items in the joint embedding space, regardless of item type, that are semantically associated with the query item.

Steps 602 and 604 are similar to steps 202 and 204 described above. As noted above, subsequent to step 204, the joint embedding space has completed training with the currently available training data set, and can be referred to as the trained joint embedding space.

In step 606, an embedded item is identified in the trained joint embedding space. The identification step may be triggered by the receipt of a query request specifying a particular keyword. The received query keyword can then be identified in the trained joint embedding space.

In step 608, other embedded items that are associated with the identified item are selected. In an embodiment, all items that have a distance from the identified item that is less than a predetermined threshold can be considered as associated items.

In step 610, the associated items are output. For example, a list of items that are related to the query item may be returned.

Figure 7:
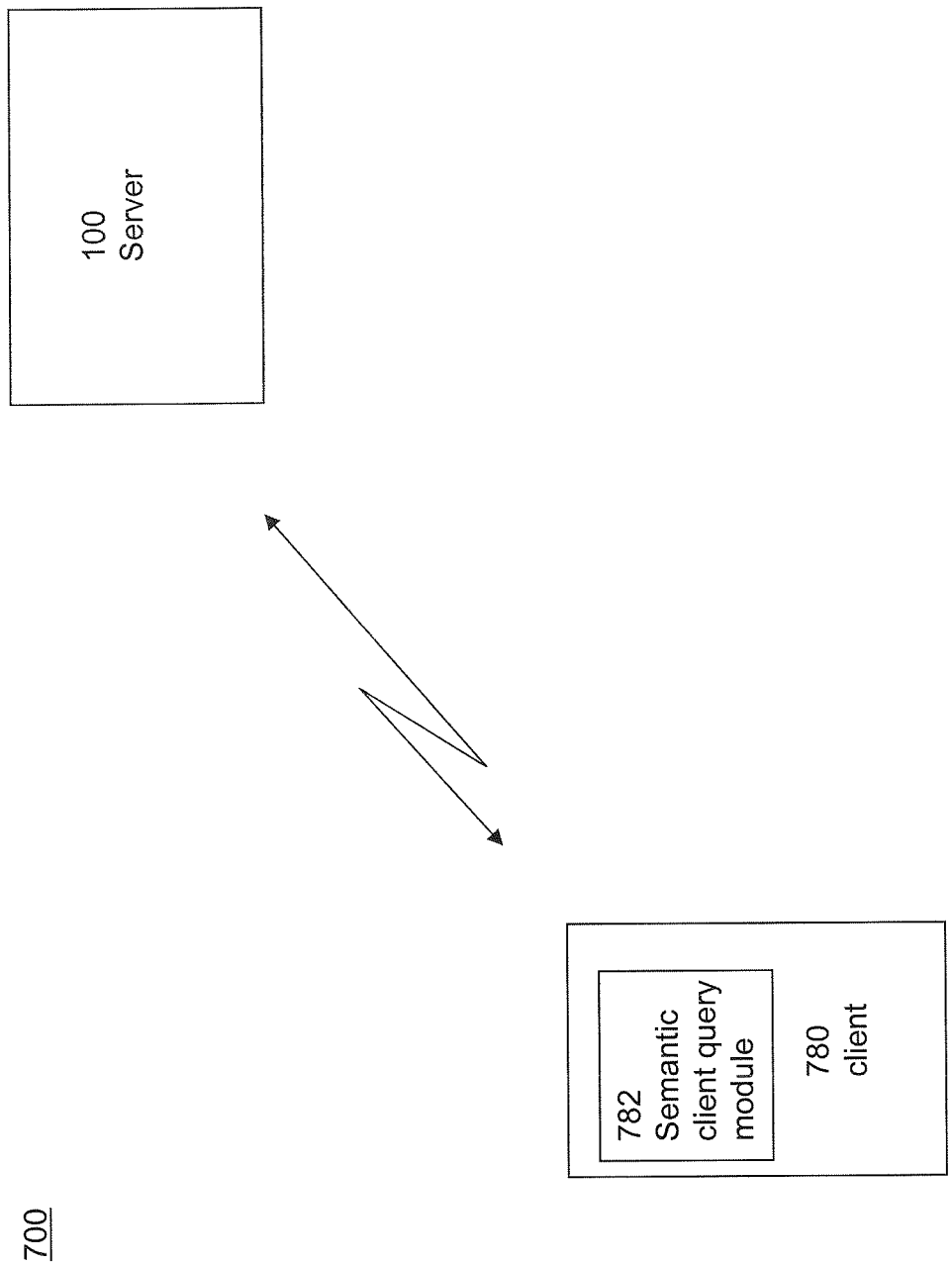
FIG. 7 illustrates components of a system for associating semantically-related items of a plurality of music-related item types, according to an embodiment.

According to another embodiment, the joint embedding space can be utilized in a music information query system. For example, as shown in FIG. 7, a music information query system 700 can include at least one server system 100 and one or more clients 780 that communicate with server system 100. According to an embodiment, in response to a query from client 780, server system 100 is configured to use a joint embedding space to perform tasks, such as, returning a list of songs or songs attributed to a particular artist, returning songs that are most similar to a given audio track, returning a list of songs that are most closely associated with a specified annotation, and like tasks. For example, semantic client query module 782 may include logic for client 780 to query server system 100.

Figure 8:
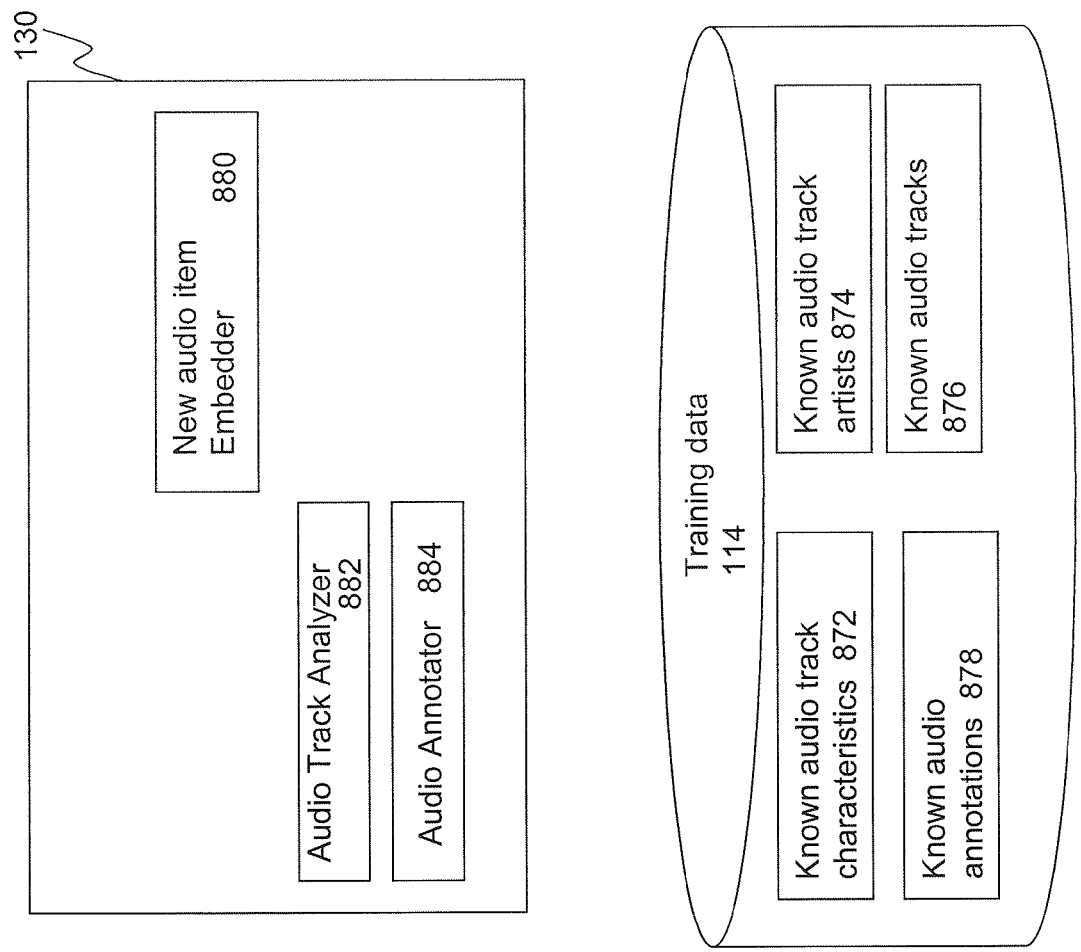
FIG. 8 illustrates a client-server environment according to an embodiment.

As shown in FIG. 8, in an embodiment, music information query system 700 can include several modules 872-878 in addition to or in place of some of the modules of server 100 shown in FIG. 1. According to an embodiment, in system 700, training data 114 may include items belonging to one or more of the item types known audio track artists 874 (e.g. names of musicians, artist's names), known audio track characteristics 872, known audio tracks 876, and known audio annotations 878. Items of known audio track characteristics 872 type can include, for example and without limitation, tags or other annotation descriptive of characteristics of an audio track, such as the type of music, instruments and the like. Examples of tags or annotations can also include descriptors such as voice, no voice, classical, not classical, drums, no drums, and the like. Tags may include user assigned tags for particular audio tracks. Audio track analyzer 882 may include logic to analyze audio tracks and determine one or more characteristics descriptive of the audio track.

In an embodiment, audio track characteristics include those determined according to the Mel Frequency Cepstral Coefficient (MFCC) representation. For each audio track, a subset of the MFCCs can be determined as features of the audio track. In another embodiment, these MFCCs can be combined with their first and second derivatives as additional features. In yet another embodiment, a set of typical MFCCs are determined for the training data set and characteristics of each audio track are represented by a vector of counts of the number of frames in the audio track that correspond to the determined typical MFCC. Other exemplary audio track characteristics or features include spectral features, temporal features, and Stabilized Auditory Image (SAI) features. SAI features are based on adaptive pole-zero filter cascade auditory filter banks. The features of the audio track can be represented as a feature vector.

As described above, data from training data 114 is used for embedding into the joint embedding space 150. New audio item embedder 880 may include logic for embedding audio items in the joint embedding space 150. For example, in an embodiment, new audio item embedder 880 can determine the location in which a new song is to be embedded based upon a mapping function learned using mapper 142. In an embodiment, new audio item embedder 880 determines a set of features of a new song and uses a mapping from the set of features to a location in joint embedding space 150. Audio annotator 884 may include logic to determine annotations based upon association of audio items in the joint embedding space 150.

Figure 9:
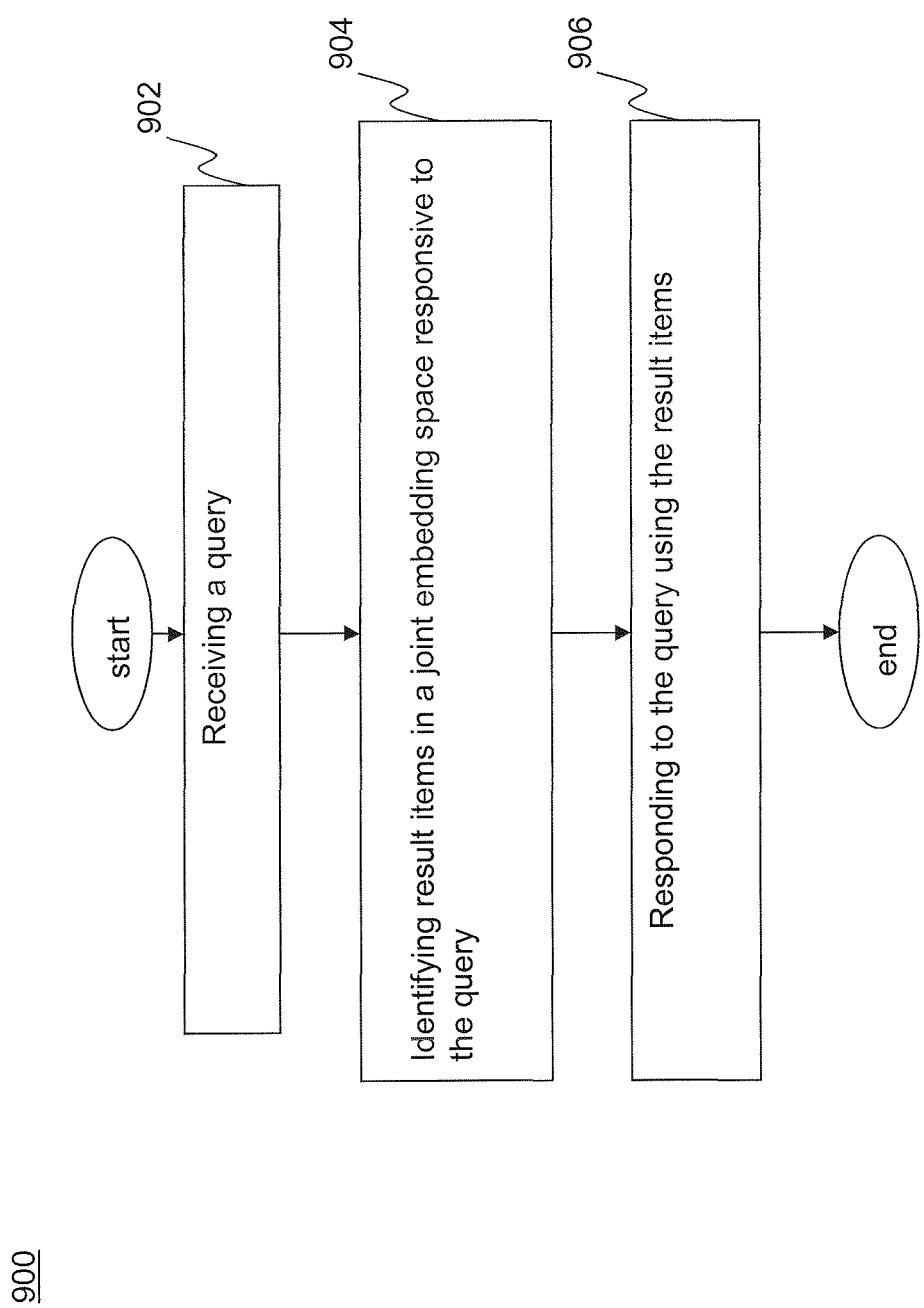
FIG. 9 illustrates a method of servicing a query according to an embodiment.

FIG. 9 illustrates a method 900 for server system 100 to respond to a query from client 780, according to an embodiment. In step 902, the server system 100 receives a query from client 780. The query can include, for example, the name of an artist. In step 904, the server system 100 embeds one or more items (e.g., name of artist received) in the joint embedding space 150. Items in the joint embedding space 150 that are within a predetermined distance from, or items that are the closest to, the embedded query are found. The determined items are then used to form a response to the query. Method 200 which is described above, for example, can be used to perform the functions of step 904. In step 906, the results to the query are returned to the querying client.

According to an embodiment, the music query information system 700 includes a joint embedding space 150 using which songs, artists and tags attributed to music can all be reasoned about jointly by learning a single model to capture the semantics of, and hence the relationships between, each of these musical concepts. Using a joint embedding space 150, these semantic relationships are modeled in a feature space of dimension d, where musical concepts (songs, artists or tags) are represented as coordinate vectors. The similarity between two concepts can be measured using the dot product between their two vector representations. Other possible instantiations include using a cosine similarity metric, or the Euclidean distance, or the p-norm distance between the two vector representations to measure similarity instead. The vectors may be learned to induce similarities relevant (e.g., by optimizing a precision metric) for tasks such as artist prediction (e.g. given a song or audio clip, return a ranked list of the likely artists to have performed it), song prediction (e.g., given an artist's name, return a ranked list of songs that are likely to have been performed by that artist), similar artists (e.g., given an artist's name, return a ranked list of artists that are similar to that artist), similar songs (e.g., given a song or audio clip, return a ranked list of songs that are similar to it), and tag prediction (e.g., given a song or audio clip, return a ranked list of tags that might best describe the song. A precision metric can include, for some predetermined value k, the number of true positives in the first k returned results.

According to an embodiment, a training database 114 can include artist names, songs (in the form of features corresponding to their audio content), and tags associated with the songs. The information in the database can be represented as in (8):

$$D=\{(a_i,t_i,s_i)\}_{i=1\ldots m} \in \{1,\ldots,|A|\}^{|t_i|} \times R^{|S|} \qquad (8)$$

where each triplet represents a song indexed by i: $a_i$ are the artist features, $t_i$ are the tag features and $s_i$ are the audio (sound) features. Each song may have attributed to it a set of artists $a_i$, and/or a corresponding set of tags $t_i$. The audio of the song itself is represented as an |S|-dimensional real-valued feature vector $s_i$.

For a given artist, i=1 ... |A|, its coordinate vector is expressed as in (9):

$$\Phi_{Artist}(i):\{1,\ldots,|A|\} \to R^d = A_i \qquad (9)$$

where $A=[A_1,\ldots A_{|A|}]$ is a d×|A| matrix of the parameters (vectors) of all the artists in the database. This entire matrix can be learned during the training phase of the algorithm.

Similarly, for a given tag i=1 ... |T|, its coordinate vector can be represented as in (10):

$$\Phi_{Tag}(i):\{1,\ldots,|T|\} \to R^d = T_i \qquad (10)$$

where $T=[T_1 \ldots T_{|T|}]$ is a d×|T| matrix of the parameters (vectors) of all the tags in the database. This matrix too can be learned during the training phase of the algorithm.

For a song or audio clip, the following function maps its audio features s' to a d-dimensional vector using a linear transform V as in (11):

$$\Phi_{Song}(s'):R^{|S|} \to R^d = Vs' \qquad (11)$$

The d×|S| matrix V can also be learned during the training phase. Mapping functions for item types are also described above in relation to step 304 of FIG. 3.

According to an embodiment, the goal of the joint embedding space in the music query information system 700 is, for a given input or query, to rank the possible outputs of interest depending on the task (e.g., artist prediction, song prediction, etc.) such that the highest ranked outputs are the best semantic match for that input. For example, for the artist prediction task, an optimization or ranking such as (12):

$$f_i^{Artist\ Prediction}(s')=f_i^{AP}(s')=\Phi_{Artist}(i)^T \Phi_{Song}(s')= A_i^T V' \qquad (12)$$

Similar ranking functions can be defined for all other tasks (e.g. artist prediction, song prediction, etc). According to embodiments, many of these tasks share the same parameters, for example, the song prediction and similar artist tasks share the matrix A whereas the tag prediction and song prediction tasks share the matrix V. Such sharing makes it possible to learn the parameters A, T and V above of the joint embedding space 150 to jointly perform two or more tasks. The joint performing of tasks may be referred to as multi-task learning.

According to an embodiment, the objective function to be optimized for a task can be defined as $\Sigma_i err'(f(x_i),y_i)$ where x is the set of input examples (e.g. from the training data), y is the set of corresponding trained target examples, and err' is a loss function that measures the quality of the current ranking. According to an embodiment, $\Sigma_i err'(f^{TP}(s_i),t_i)$ can be minimized for a tag prediction task and $\Sigma_i err'(f^{AP}(s_i),a_i)$ can be minimized for an artist prediction task. In embodiments, in a manner similar to that described in relation to (5) above, each of the task functions can be separately minimized. According to another embodiment, the task functions can be multi-tasked, or more specifically, minimized together as in (13):

$$err'^{AP+TP}(D)=\Sigma_i err'(f^{TP}(s_i),a_i)+\Sigma_i err'(f^{TP}(s_i),t_i) \qquad (13)$$

As shown in (13), to multi-task these two tasks, the (unweighted) sum of the two objective functions can be considered. Multi-tasking can be extended to more than two tasks in the manner indicated in (13). Optimization of the joint embedding space for various tasks, such as those in (13), for example, can be performed using a stochastic gradient descent approach, as described above in relation to another embodiment. This can amount to iteratively repeating the following procedure: picking one of the tasks at random, picking one of the training input-output pairs for this task, and making a gradient step for this task and input-output pair. The iterations continue until a termination criteria, such as a magnitude of the error (e.g., err' from above), is below a threshold. The procedure is the same when considering more than two tasks. An application of gradient descent to optimize a joint embedding space is described above in relation to FIGS. 4-5.

Conclusion

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for associating semantically-related items of a plurality of item types, comprising:
   (a) embedding, by one or more computers, training items of the plurality of item types in a joint embedding space having more than two dimensions configured in a memory coupled to at least one processor, wherein each of the dimensions is defined by a real-valued axis, wherein each embedded training item corresponds to a respective location in the joint embedding space, wherein said each embedded training item is represented by a respective vector of real numbers corresponding to the respective location, and wherein each of the real numbers of the vector corresponds to a mapping of the respective location to one of the dimensions;
   (b) learning, by the one or more computers, one or more mappings into the joint embedding space for each of the plurality of item types to create a trained joint embedding space and one or more learned mappings, the learning including:
      selecting, based on known relationships between the training items, a related pair of the training items that includes a first item and a second item, wherein the first item and the second item are separated by a first distance in the joint embedding space;

selecting a third item that is less related to the first item than the second item, but is closer to the first item than the second item in the joint embedding space; and adjusting a mapping function to increase a distance between the first item and the third item relative to a distance between the first item and the second item; and (c) associating, by the one or more computers, one or more of the embedded training items with a first item based upon a distance in the trained joint embedding space from the first item to each said associated embedded training items, wherein each said distance is determined based upon a first vector of real numbers corresponding to the first item and a second vector of real numbers corresponding to a respective one of the associated embedded training items.

2. The method of claim 1, further comprising:

(d) embedding the first item at a first location, determined by applying the one or more learned mappings for a first item type of the plurality of item types, in the trained joint embedding space.

3. The method of claim 2, further comprising:

(e) annotating the first item based upon the one or more associated embedded training items closest to the first item in the trained joint embedding space.

4. The method of claim 1, wherein the adjusting step (iii) further comprises updating a respective vector of real numbers to include one or more changed location of the third item.

5. The method of claim 1, further comprising:

moving at least one of the first or third items in the joint embedding space such that a distance in the trained joint embedding space.

6. The method of claim 5, wherein the moving is based upon a stochastic gradient descent technique.

7. The method of claim 1, wherein the adjusting is based upon a stochastic gradient descent technique.

8. The method of claim 1, wherein the selecting step (i) comprises:

iteratively choosing an item as the third item until a distance in the trained joint embedding space from the first item to the third item is less than the distance between the first and second items; and estimating a rank of the third item in relation to the second item based upon a number of iterations required to choose the third item.

9. The method of claim 5, wherein the moving comprises:

moving, based on the adjusted mapping function, at least one of the first, second, or third items in the joint embedding space such that a distance in the trained joint embedding space between the first and second items is less than a distance between the first and third items.

10. The method of claim 9, wherein the moving is based upon a stochastic gradient descent technique weighted based upon the estimated rank.

11. The method of claim 1, wherein the learning step (b) further comprises:

(iv) repeating at least steps (i)-(iii) until a predetermined termination criteria is satisfied.

12. The method of claim 1, wherein the learning step (b) further comprises:

learning a first mapping function for all items of a first item type; and learning respective mapping functions for each of a plurality of items of a second item type.

13. The method of claim 1, further comprising:

identifying a query subject in the trained joint embedding space, wherein the query subject is an embedded training item;

determining one or more trained embedded items located within a predetermined distance of the query subject as result items; and outputting the result items.

14. A system for associating semantically-related items of a plurality of item types, comprising:

at least one processor;

a memory coupled to the at least one processor;

a joint embedding space configurator configured to embed training items of the of the plurality of item types in a joint embedding space in the memory, wherein the joint embedding space has more than two dimensions, wherein each of the dimensions is defined by a real-valued axis, wherein each embedded training item corresponds to a respective location in the joint embedding space, wherein said each embedded training item is represented by a respective vector of real numbers corresponding to the respective location, and wherein each of the real numbers of the vector corresponds to a mapping of the respective location to one of the dimensions;

a mapper configured to learn one or more mappings into the joint embedding space for each of the item types to create a trained joint embedding space and one or more learned mappings, wherein the mapper learns the one or more mappings by performing operations including:

selecting, based on known relationships between the training items, a related pair of the training items that includes a first item and a second item, wherein the first item and the second item are separated by a first distance in the joint embedding space;

selecting a third item that is less related to the first item than the second item, but is closer to the first item than the second item in the joint embedding space; and adjusting a mapping function to increase a distance between the first item and the third item relative to a distance between the first item and the second item; and an item associator configured associate one or more of the embedded training items with a first item based upon a distance in the trained joint embedding space from the first item to each associated embedded training items, wherein each said distance is determined based upon a first vector of real numbers corresponding to the first item and a second vector of real numbers corresponding to a respective one of the associated embedded training items.

15. The system of claim 14, further comprising:

a new item embedder configured to embed a first item at a first location in the trained joint embedding space, the first location determined by applying a learned mapping for a first item type of the plurality of item types.

16. The system of claim 15, further comprising:

an annotator configured to annotate the first item based upon the one or more associated embedded training items closest to the first item in the trained joint embedding space.

17. The system of claim 15, wherein the mapper is further configured to learn the mapping for one or more item types using a stochastic gradient technique.

18. The system of claim 17, wherein the mapper is further configured to:

iteratively choose an item as the third item until a distance in the trained joint embedding space from the first item to the third item is less than the distance between the first and second items; and estimate a rank of the third item in relation to the second item based upon a number of iterations required to choose the third item; and move at least one of the first, second, or third items in the joint embedding space such that a distance in the trained joint embedding space between the first and second items is less than a distance between the first and third items, wherein the move is based on a stochastic gradient technique weighted based upon the estimated rank.

19. The system of claim 14, wherein the joint embedding space comprises a predetermined number of real valued axis.

20. The system of claim 14, further comprising:
a semantic query module configured to:
identify a query subject in the trained joint embedding space, wherein the query subject is an embedded training item; and
determine one or more trained embedded items located within a predetermined distance of the query subject as result items.

21. A non-transitory computer readable medium storing instructions wherein said instructions when executed cause at least one processor to associate semantically-related items of a plurality of item types using a method comprising:
embedding training items of the plurality of item types in a joint embedding space configured in a memory coupled to at least one processor, wherein the joint embedding space has more than two dimensions, wherein each of the dimensions is defined by a real-valued axis, and wherein each embedded training item corresponds to a respective location in the joint embedding space, wherein said each embedded training item is represented by a respective vector of real numbers corresponding to the respective location, and wherein each of the real numbers of the vector corresponds to a mapping of the respective location to one of the dimensions;
learning one or more mappings into the joint embedding space for each of the item types to create a trained joint embedding space and one or more learned mappings, the learning including:
selecting, based on known relationships between the training items, a related pair of the training items that includes a first item and a second item, wherein the first item and the second item are separated by a first distance in the joint embedding space;
selecting a third item that is less related to the first item than the second item, but is closer to the first item than the second item in the joint embedding space; and
adjusting a mapping function to increase a distance between the first item and the third item relative to a distance between the first item and the second item; and
associating one or more of the embedded training items with a first item based upon a distance in the trained joint embedding space from the first item to each said associated embedded training items, wherein each said distance is determined based upon a first vector of real numbers corresponding to the first item and a second vector of real numbers corresponding to a respective one of the associated embedded training items.

22. The method of claim 1, further comprising:
receiving a query;
determining, in response to the query, a location in of the query in the joint embedding space;
identifying one or more results based upon one or more items embedded in the joint embedding space closest to the location; and
returning the one or more results as a response to the query.

23. The method of claim 22, wherein the determining the location comprises:
determining a query item based upon the received query; and
embedding the query item at the location, wherein the location is determined by applying at least one learned mapping for an item type of the query item.

24. The method of claim 22, wherein the query includes an artist's name or a song and the one or more results include at least one of a second artist's name and a second song, wherein the at least one of a second artist's name and a second song is associated with the artist's name or the song.

25. The method of claim 22, wherein the query includes a tag, and the one or more results include at least one image, wherein the image is associated with the tag.

* * * * *